US009973454B2

(12) United States Patent
Yang (10) Patent No.: US 9,973,454 B2
(45) Date of Patent: May 15, 2018

(54) ENHANCED VIDEO INSTANT MESSAGING PROCESSING (71) Applicant: Tencent Technology (Shenzhen) Company Limited, Guangdong (CN)

(72) Inventor: Qiang Yang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 237 days.

(21) Appl. No.: 14/891,925

(22) PCT Filed: Jul. 16, 2014

(86) PCT No.: PCT/CN2014/082314
§ 371 (c)(1),
(2) Date: Nov. 17, 2015

(87) PCT Pub. No.: WO2015/010561
PCT Pub. Date: Jan. 29, 2015

(65) Prior Publication Data
US 2016/0127281 A1 May 5, 2016

(30) Foreign Application Priority Data

Jul. 25, 2013 (CN) .......................... 2013 1 0317295

(51) Int. Cl.
*G06F 15/16* (2006.01)
*H04L 12/58* (2006.01)
*H04L 12/18* (2006.01)
(52) U.S. Cl.
CPC .......... *H04L 51/04* (2013.01); *H04L 12/1818* (2013.01)
(58) Field of Classification Search
USPC ........ 709/206, 207, 201, 202, 203, 205, 204
See application file for complete search history.

(56) References Cited

U.S. PATENT DOCUMENTS

2003/0018726 A1\* 1/2003 Low ........................ H04L 51/04
709/206
2012/0324096 A1\* 12/2012 Barzel ................... G06F 9/5088
709/224

(Continued)

FOREIGN PATENT DOCUMENTS

| CN | 101047662 A | 10/2007 |
| CN | 101247364 A | 8/2008 |
| CN | 102638416 A | 8/2012 |

OTHER PUBLICATIONS

Patent Cooperation Treaty, International Search Report, International Patent Application No. PCT/CN2014/082314, dated Sep. 22, 2014, 3 Pages.

(Continued)

*Primary Examiner* — Lan-Dai T Truong
(74) *Attorney, Agent, or Firm* — Anova Law Group, PLLC (57) ABSTRACT

An enhanced instant messaging processing method is presented to users in an instant messaging communication environment. For a user having two or more communication terminals that have logged into a same instant messaging account of the user, a communication server monitors invitations sent to the instant messaging account. Responsive to one communication terminal responding to the invitation and the type of the response, the communication server generates a response policy for each of other communication terminals of the user, where the response policy optimizes the instant communication performance enhances the user experience. The disclosed embodiments also support simultaneous instant communications among a large number of users connected to multiple data processing servers. The disclosed solution for support simultaneous instant communications balances the load of the data processing servers (Continued)

while keeping multiple communication terminals of a user informed of the status of the instant communication.

26 Claims, 7 Drawing Sheets

(56) References Cited

U.S. PATENT DOCUMENTS

| | | | |
|---|---|---|---|
| 2013/0007150 A1* | 1/2013 | Hertz | H04L 51/32 709/206 |
| 2014/0207605 A1* | 7/2014 | Allin | G06Q 30/0611 705/26.4 |

OTHER PUBLICATIONS

Patent Cooperation Treaty, Written Opinion of the International Searching Authority, International Patent Application No. PCT/CN2014/082314, dated Sep. 22, 2014, 4 Pages.

* cited by examiner

ENHANCED VIDEO INSTANT MESSAGING PROCESSING

TECHNICAL FIELD

The disclosure relates generally to the field of Internet based network communications, and specifically to video instant messaging processing that supports simultaneous communications by multiple computing devices.

BACKGROUND

With more available broadband and high-speed Internet connections and the proliferation of portable electronic devices such as smart phones, tablet computers and notebook computers, video instant messaging is used by many users for real-time communications over the Internet. Video instant messaging is a type of instant messaging (IM), which is a real-time online communication service. Video instant messaging provides advance features in addition to those provided by text IM by enabling real-time visual communications via audio and video capturing the communications of multiple users.

The wide usage of video instant messaging has highlighted a number of challenges including efficiently processing video messaging invitations/requests and responses. It is common that a user of an IM service, including video instant messaging, may have more than one communication device/terminal, e.g., a desktop computer and a smart phone, which can receive and respond to an IM invitation though one single IM service account. When an IM invitation is sent to a user's IM service account, the multiple communication terminals of the user may all receive the invitation. Existing solutions in such a situation allow multiple communication terminals of the user to respond to the invitation. However, one communication terminal's response to the invitation is not known to other communication terminals, which may continue to try to respond to the invitation, resulting in a degraded user experience.

SUMMARY

Embodiments of the invention provide enhanced instant messaging processing. A computer-implemented method for processing instant messaging, e.g., video instant messaging, is disclosed. Embodiments of the method comprise monitoring an invitation of instant messaging sent to an instant messaging account of a receiving party, where the receiving party has at least two communication terminals, each of which can be used to access the same instant messaging account. The method further comprises steps of receiving a response to the invitation by a communication terminal of the receiving party and generating a response policy for the other communication terminal(s) of the receiving party. The response policy for the other communication terminal(s) is generated based on the received response to the invitation, e.g., acceptance or rejection. The response policy concerns the invitation previously provided to the other communication terminal(s) and is transmitted to the other communication terminal(s) for execution.

Another aspect provides enhanced instant messaging processing that supports simultaneous instant communications among a large number of users. Embodiments of the method comprise receiving an invitation of instant messaging from a sending party to a receiving party and transmitting the invitation to an instant messaging account of the receiving party. The receiving party has more than one communication terminal and at least two of the communication terminals have logged onto the same instant messaging account. The method further comprises steps of retrieving data describing network conditions associated with a communication terminal of the sending party, e.g., network connections and data packet loss rate. A data processing server is selected among a plurality of data processing servers based on the retrieved data. The communication terminal of the sending party and the communication terminals of the receiving party are connected to the selected data processing server. Upon receiving a response to the invitation by a communication terminal of the receiving party, a response policy for each of the other communication terminals of the receiving party is generated.

The features and advantages described in the specification are not all inclusive and, in particular, many additional features and advantages will be apparent to one of ordinary skill in the art in view of the drawings, specification, and claims. Moreover, it should be noted that time language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompany-

Enhanced Video Instant Messaging Processing for a Single User

A solution to efficient video instant messaging process described above is an enhanced IM communication system that processes invitations (also referred to as "requests") from a user to other users in an online real-time communication environment. In this disclosure, "instant messaging" generally refers to any services, tools or protocols for facilitating real-time communications over a computer network among multiple parties using any type of computer communication devices. The following discussion focuses on video instant messaging. However, the techniques described below can also be used with other types of instant messaging.

Figure 5:
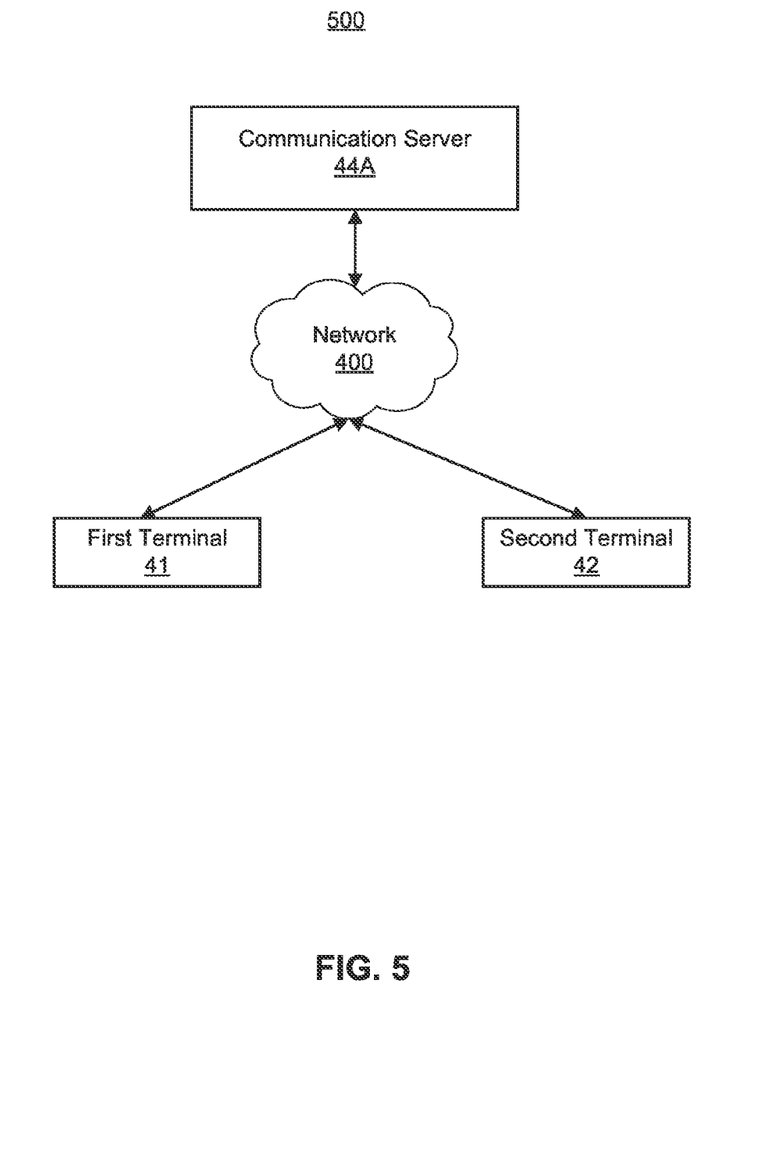
FIG. 5 is a block diagram of a computing environment for supporting enhanced video instant messaging process for a user having two communication terminals according to one embodiment.

FIG. 5 is a block diagram of a computing environment 500 for supporting enhanced video instant messaging process for a user having two communication terminals from which the user can access his instant messaging account, according to one embodiment. In the embodiment illustrated in FIG. 5, the computing environment 500 includes a communication server 44A and two communication terminals 41 and 42 connected by a network 400. An example of the computing environment is an instant messaging platform, e.g., Tencent QQ. A user uses either terminal or both terminals to communicate with another party in an instant messaging platform through the communication server 44A. Embodiments of the computing environment 500 can have communication servers 44A and communication terminals 41 and 42 connected to the network 400. Likewise, the functions performed by the various entities of FIG. 5 may differ in different embodiments.

A communication terminal 41 or 42 is an electronic device used by a user to perform functions such as online video/voice chat and instant messaging in text. Taking first terminal 41 as an example, the first terminal 41 may be a smart phone, or tablet, notebook, or desktop computer. The first terminal 41 may include and/or interact with a display device on which the user may view the video capturing the other party during video chat. In addition, the first terminal 41 provides a user interface (UI), such as physical and/or on-screen buttons, with which the user may interact with the first terminal 41 to perform functions related to online video chat.

In one embodiment, the first terminal 41 and the second terminal 42 belong to a user and either can be used by the user to access his IM account for receiving and sending instant messages to other users in an instant messaging platform. For example, the first terminal 41 is a personal computer (PC) of the user and the second terminal 42 is the user's mobile phone. The user can log into his/her instant messing account, e.g., QQ account, using either terminal (41 or 42) for video instant messaging with another party. The user can simultaneously log into his/her instant messaging account using both terminals 41 and 42. The simultaneous login allows both terminals 41 and 42 to receive instant messaging invitations from another party.

The network 400 enables communications among the communication server 44A and the communication terminals 41 and 42 of a user and can comprise the Internet. In one embodiment, the network 400 uses standard communications technologies and/or protocols such as communication protocols for IM. In another embodiment, the entities can use custom and/or dedicated data communications technologies instead of, or in addition to, the ones described above, e.g., Tencent QQ protocol. The IM system using Tencent QQ protocol supports Internet-based IM platforms and provides online communication services, including text messaging and video and voice chat cross a variety of communication terminals, e.g., PC and wireless terminals.

The communication server 44A monitors the communications among parties in an instant messing environment and processes the video instant messaging with enhanced user experience. In one embodiment, the communication server 44A detects whether multiple communication terminals of a receiving party of a video instant messaging invitation have logged into the same IM account of the receiving party. Simultaneous login to an IM account by multiple communication terminals of a party allows the multiple communication terminals to receive IM invitations sent to the IM account. Responsive to the detection that multiple communication terminals of the receiving party have logged into the same IM account and upon receiving a response to the invitation from one communication terminal of the multiple communication terminals of the receiving party, the communication server 44A generates a response policy for the other communication terminals of the receiving party based on the response to the invitation. The communication server 44A is further described with reference to FIGS. 1-3.

Figure 3:
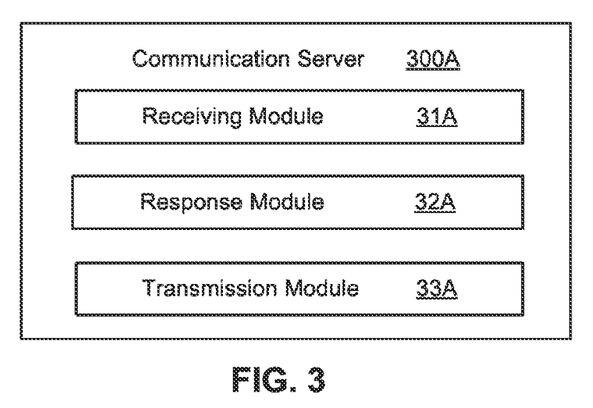
FIG. 3 is a block diagram illustrating a communication server for enhanced video instant messaging process according to one embodiment.

FIG. 3 is a block diagram illustrating a communication server 300A for enhanced video instant messaging process according to one embodiment. The communication server 300A illustrated in FIG. 3 includes a receiving module 31A, a response module 32A and a transmission module 33A. Other embodiments of the communication server 300A, e.g., the embodiment illustrated in FIG. 4, may include additional and/or different modules. Likewise, the functions performed by the various entities of FIG. 3 may differ in different embodiments.

The receiving module 31A of the communication server 300A monitors video instant messaging invitations to and responses from communication terminals of parties of video instant messaging. In one embodiment, the receiving module 31A detects whether multiple communication terminals of a receiving party of a video instant messaging invitation have logged into the same IM account of the receiving party. Assuming the receiving party of the video instant messaging invitation has two communication terminals, e.g., the first terminal 41 and the second terminal 42 as in FIG. 5, responsive to detecting both terminals 41 and 42 having logged into the same IM account, the receiving module 31A receives a first response to the invitation from one of the terminals 41 or 42 and interacts with the response module 32A of the communication server 300A for further processing.

A response to a video instant messaging invitation from a communication terminal can be "acceptance" or "rejection." A response of acceptance indicates the receiving party is to communicate with the sending party via online video chat. A response of rejection indicates that the receiving party is not to communicate with the sending party.

The response module 32A generates a response policy for the other communication terminals of a receiving party based on the response to a video instant messaging invitation from a responding communication terminal of the receiving party. The response policy for a communication terminal indicates current status of the video instant messaging, e.g., invitation accepted or ejected, and instructions on how to proceed with the invitation. An example of a response policy based on an acceptance may read as follows: "Your IM account has already been logged in by a PC, which has accepted the invitation. The invitation shown on your display of your smart phone here is to be closed," An example of a response policy based on a rejection may read as follows: "Your IM account has already been logged in by a PC, which has rejected the invitation. The invitation shown on your display of your smart phone here is to be closed."

Taking the first terminal 41 and the second terminal 42 of a party illustrated in FIG. 5 as an example, and assuming both terminals 41 and 42 have logged into an IM account of the party, an invitation sent to the account of the party is received by both terminals 41 and 42 and both terminals 41 and 42 are ready to respond to the invitation. If the party at the first terminal 41 accepts the invitation, e.g., clicking an "accept" button on the first terminal 41, the acceptance is detected by the receiving module 31A of the communication server 300A. The response module 32A generates a response policy for the second terminal 42 that indicates that the invitation has been accepted and instructs the second terminal 42 to stop trying to respond to the invitation.

The transmission module 33A transmits the response policy generated by the response module 32A to a communication terminal that tries to respond to the invitation, e.g., the second terminal 42 in the example above, of the receiving party. In one embodiment, the transmission module 33A includes instructions for the communication terminal to display the response policy on a display screen of the communication terminal. In another embodiment, the transmission module 33A also embeds executable computer code in the response policy that will automatically runs on the communication terminal to disable the buttons for acceptance or rejection.

Enhanced Video Instant Messaging Processing for Multiple Users

The advancement of broadband and high-speed Internet connections supports a large number of IM users in an IM system to communicate with each other at any given time. For example, Tencent QQ system can support hundreds of millions of users using the system at the same time. However, supporting a large number of IM users at any given time requires efficient task scheduling and resource allocations.

Figure 6:
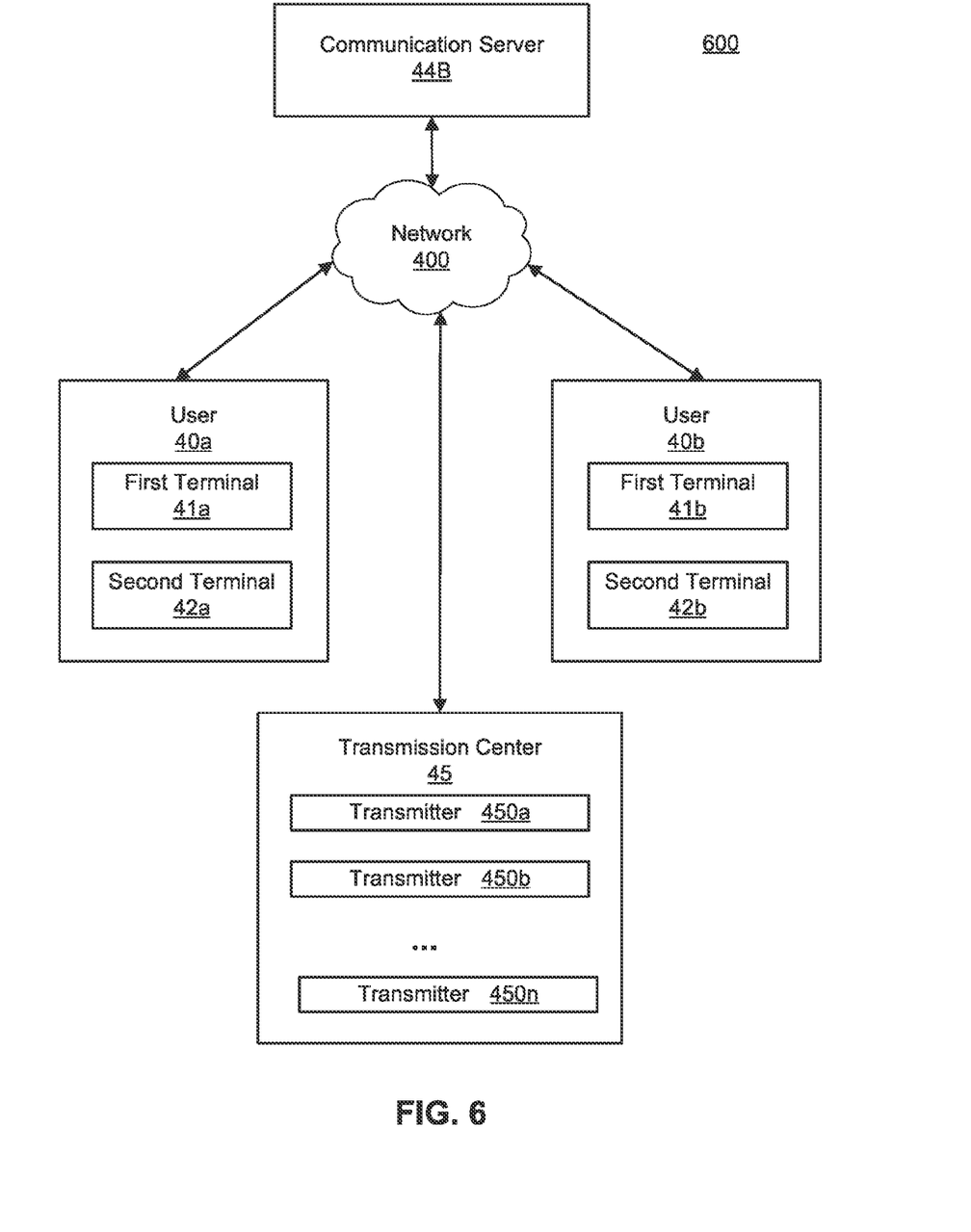
FIG. 6 is a block diagram of a computing environment for supporting enhanced video instant messaging process for multiple users having multiple communication terminals according to one embodiment.

FIG. 6 is a block diagram of a computing environment 600 for supporting enhanced video instant messaging process for multiple users having multiple communication terminals according to one embodiment. In the embodiment illustrated in FIG. 6, the computing environment 600 includes a communication server 44B, two users 40a and 40b and a transmission center 45 connected by a network 400. Each of the users 40a and 40b has one or more communication terminals. Only one communication server 44B, two users 40 and one transmission center 45 are shown in FIG. 6 in order to simplify and clarify the description. Embodiments of the computing environment 600 can have many communication servers 44B, users 40 and transmission centers 45. The communication server 44B is further described with reference to FIG. 4.

In the embodiment illustrated in FIG. 6, each of the users 40a and 40b has two communication terminals. For example, user 40a has a first terminal 41a and a second terminal 42a; user 40b has a first terminal 41b and a second terminal 42b. User 40a can use either one of the two terminals 41a and 41b to send a video instant message invitation to user 40b at an IM account of user 40b. Both terminals 41b and 42b of user 40b can simultaneously receive the invitation from user 40a if the terminals 41b and 42b have logged into the same IM account of the user 40b. The communication server 44B detects a response to the invitation from a terminal of the two terminals of user 40b and generates a response policy to the other terminal of user 40b. The communication server 44B interacts with the transmission center 45 to select a data transmitter to transmit data packets encapsulating IM invitations, responses and IM messages with optimal transmission performance.

The transmission center 45 includes multiple data transmitters 450a-450n. In one embodiment, a data transmitter 450 is a data server that transmits data packets of IM invitations, responses and messages among the users 40 in an IM communication system, e.g., Tencent QQ system. Each data transmitter 450 has information describing various aspects of the data transmitter, e.g., identification of the data transmitter 450, communication protocols, audio/video processing capacity and compression schemes supported by the data transmitter 450, network capacity and connection speed, data packet loss rate and status of the data transmitter 450. The information associated with a data transmitter can be used by the communication server 44B to balance network load assigned to the data transmitters and schedule data transmission to achieve an optimized video instant messing processing performance. In one embodiment, the data transmitters 450a-450n may be owned by one Internet service provider (ISP) or by multiple ISPs, and each data transmitter may provide IM service to a particular geographical location.

Figure 4:
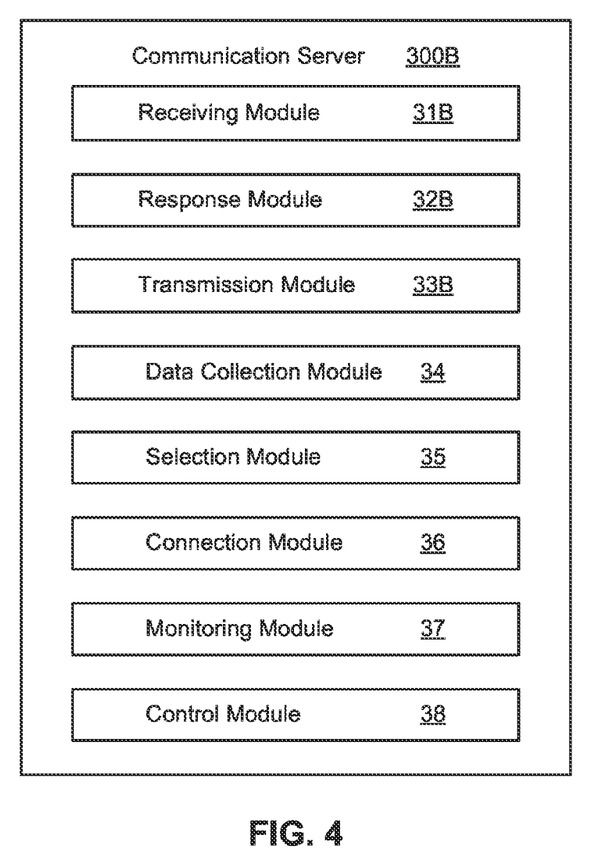
FIG. 4 is a block diagram illustrating a communication server connected with multiple data transmitters to support video instant messaging process for multiple users according to one embodiment.

FIG. 4 is a block diagram illustrating a communication server 300B connected with multiple data transmitters to support video instant messaging process for multiple users according to one embodiment. The communication sever 300B illustrated in FIG. 4 includes a receiving module 31B, a response module 32B, transmission module 33B, a data collection module 34, a selection module 35, a connection module 36, a monitoring module 37 and a control module 38. Other embodiments of the communication server 300B can have additional and/or different modules.

In one embodiment, the receiving module 31B, the response module 32B and the transmission module 33B provide similar or identical functionalities as their corresponding receiving module 31A, the response module 32A and the transmission module 33A of the communication server 300A. Additionally, the receiving module 31B, the response module 32B and the transmission module 33B may perform additional steps that are suitable for supporting video instant messaging process for multiple users such as reporting statistics generated from their associated operations to the data collection module 34 for load balancing.

The data collection module 34 collects data describing various data transmitters, e.g., the data transmitters 450a-n of the transmission center 45 and/or communication terminals. The collected data may include network capacity, connection speed, data packet loss rate and status of the data transmitters. For example, the status of a data transmitter indicates whether the data transmitter is functioning normally under its current work load. A high data packet loss rate of a data transmitter may indicate that the data transmitter has a work load heavier than its processing capacity and that the data transmitter needs to have some work load reassigned to other data transmitters which have lighter work load. Additionally, the data collection module 34 collects networking condition data of ISPs that are associated with the data transmitters. The collected data about the ISPs helps the communication server 300B to perform load balancing on a global scale.

The selection module 35 selects a data transmitter from multiple data transmitters based on the collected data of the data transmitters, communication terminals and/or ISPs, where the selected data transmitter is able to process video instant messaging with a balanced load. Other criteria for selecting a data transmitter can also be considered such as geographical location of the data transmitter relative to the communicating parties of video instant messaging. Selecting a data transmitter which is closer to the communicating parties generally means a shorter distance the network data packets carrying the video instant messaging communication need to travel comparing a data transmitter that is far away.

The connection module 36 connects the communicating parties with the selected data transmitter. In one embodiment, the connection module 36 first connects the sender of the video instant messaging invitation to the selected data transmitter and then connects the receiver of the video instant messaging invitation and vice versa. For example, the connection module 36 sends the network data packets carrying the video instant messaging invitation to the selected data transmitter and adds header information and payload of the data packets according to the network protocols used by the data transmitter.

The monitoring module 37 monitors data transmitters and detects abnormal behaviors of the data transmitters, e.g. high data packet loss rate and frequent shutdowns. The monitoring module 37 sends reports describing the monitored data transmitters to the communication server 300B for further actions such as reassigning work load among the data transmitters and launching further investigation of the troubled data transmitters. The monitoring module 37 can send the reports periodically and automatically or upon a request front the communication server 300B.

The control module 38 interacts with other modules of the communication server 300B to detect abnormality in or more data transmitters and takes preventive and/or remedial actions to prevent damages to the process of video instant messaging. For example, upon detecting abnormality in a data transmitter, the control module 38 may temporally or permanent take the data transmitter from service and inform the communication server 300B to adjust work load among remaining data transmitters.

Figure 7:
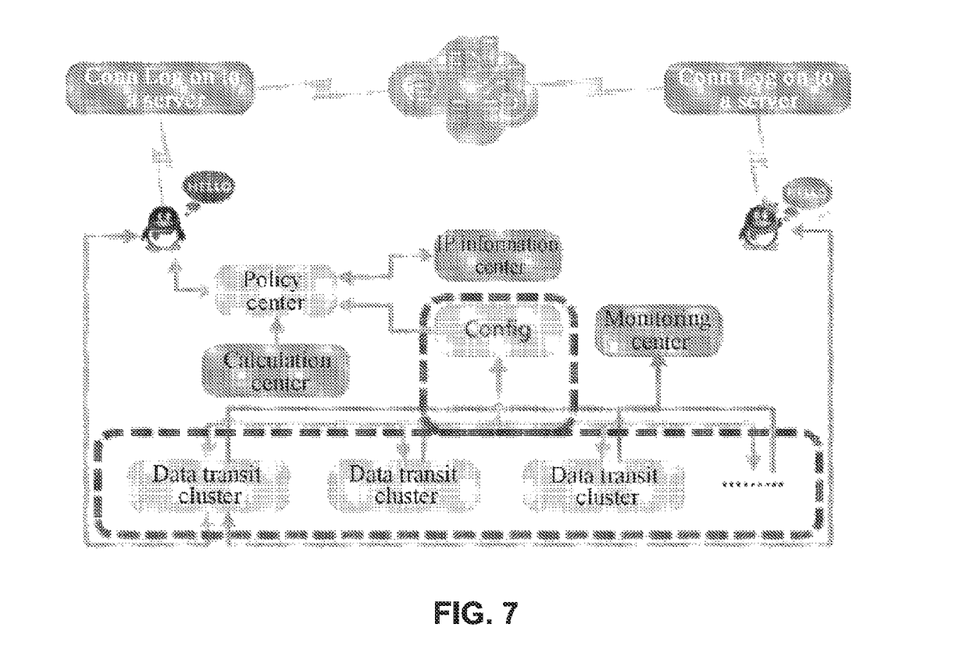
FIG. 7 is an example of the computing environment illustrated in FIG. 6 for supporting enhanced video instant messaging process for multiple users having multiple communication terminals.

FIG. 7 is an example of the computing environment illustrated in FIG. 6 for supporting enhanced video instant messaging process for multiple users having multiple communication terminals. The two symbols of penguins represent two users such as the users 40a and 40b illustrated in FIG. 6. The data transit clusters form the transmission center as the transmission center 45 illustrated in FIG. 6, and each data transit cluster functions as a data transmitter 450 illustrated in FIG. 6. The IM communications between the two users are monitored and scheduled by the various components of the computing environment including a policy center for generating response polices, a calculation center for evaluating network conditions, data packet loss rate and other related statistics, a monitoring center for monitoring the IM communications, an IP information center to collect network condition data associated with communication terminals, ISPs and data transit clusters and a configuration module for selecting data transit cluster and load balancing. The various components of the computing environment are configured to implement the functions of the communication server 300B illustrated in FIG. 6.

Computing System Architecture

Figure 8:
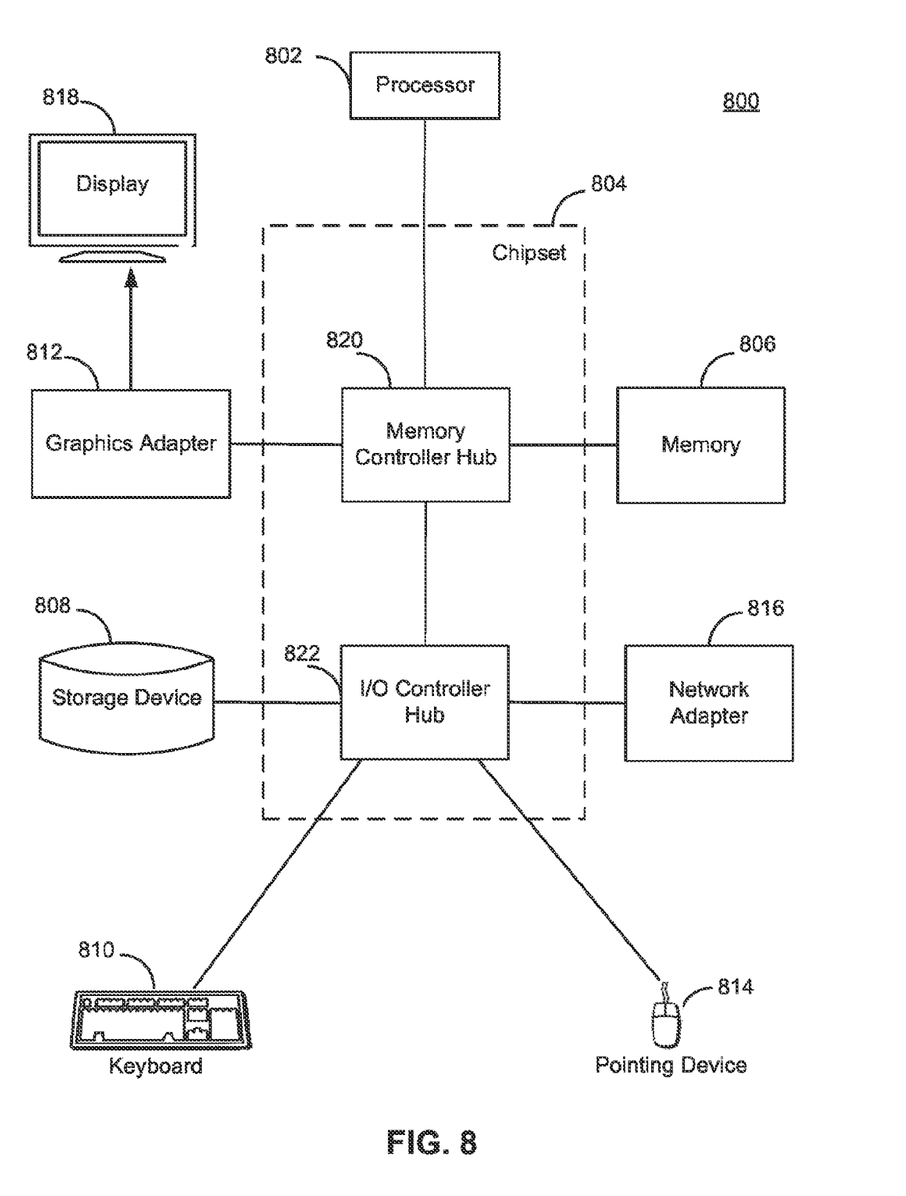
FIG. 8 is a block diagram illustrating an example of a computer for acting as a communication terminal and/or communication server in one embodiment.

FIG. 8 is a block diagram illustrating an example of a computer for acting as a communication terminal and/or communication server in one embodiment. The entities shown in FIG. 5 and/or FIG. 6 are implemented using one or more computers. FIG. 8 is a high-level block diagram of a computer 800 for acting as the communication server 44A and/or a communication terminal such as the first terminal 41 and the second terminal 42 in FIG. 5. Illustrated are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O controller hub 822. In another embodiment, the memory 806 is coupled directly to the processor 802 instead of the chipset 204.

The storage device 808 is any non-transitory computer-readable storage medium, such as a hard drive, compact disk read-only memory (CD-ROM), DVD, or a solid-state memory device. The memory 806 holds instructions and data used by the processor 802. The pointing device 814 may be a mouse, track ball, or other type of pointing device, and is used in combination with the keyboard 810 to input data into the computer system 800. The graphics adapter 812 displays images and other information on the display 818. The network adapter 816 couples the computer system 800 to the network 400.

As is known in the art, a computer 800 can have different and/or other components than those shown in FIG. 8. In addition, the computer 800 can lack certain illustrated components. For example, the computers acting as the communication server 44A can be formed of multiple blade servers linked together into one or more distributed systems and lack components such as keyboards and displays. Moreover, the storage device 808 can be local and/or remote from the computer 800 such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 806, and executed by the processor 802.

Exemplary Methods

Figure 1:
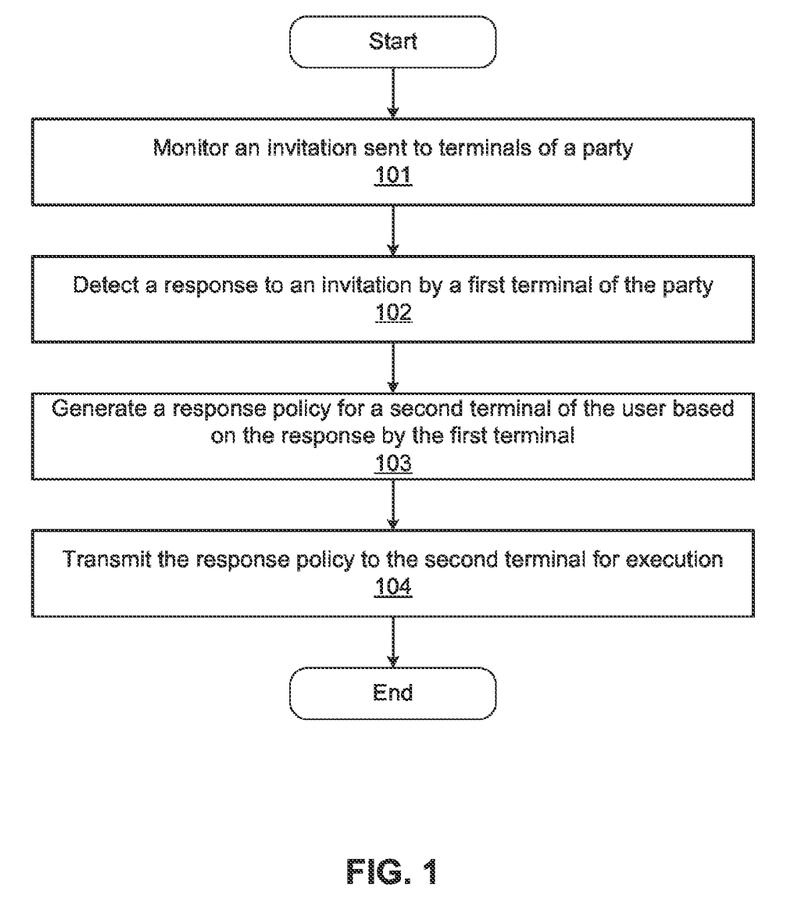
FIG. 1 is a flowchart illustrating a process for generating a response policy to an instant messaging invitation for a second communication terminal of a user according to one embodiment.

FIG. 1 is a flowchart illustrating a process for generating a response policy to an instant messaging invitation for a second communication terminal of a user according to one embodiment. Some embodiments may perform the steps in parallel, perform the steps in different orders, or perform different steps.

Initially, a communication server such as the communication server 44A illustrated in FIG. 5 monitors 101 an IM invitation, e.g., a video instant messaging invitation, sent to terminals of a receiving party. The receiving party has at least one communication terminal such as a PC, and the receiving party often has more than one communication terminal, e.g., a PC and smart phone. If multiple terminals of the receiving party have logged into a same IM account of the party, more than one terminal may receive the invitation sent to the IM account of the party.

The communication server 44A detects 102 a response to the invitation, e.g., acceptance or rejection, by a first terminal of the party. The communication server 44A generates 103 a response policy for a second terminal of the party. The response policy includes the status of the invitation, e.g., acceptance or rejection, the identification of the terminal that first responded, and instructions for the second terminal on how to process the invitation. The communication server 44A transmits 104 the response policy to the second terminal for execution, e.g., turn off the display of the invitation on the display of the second terminal.

Figure 2:
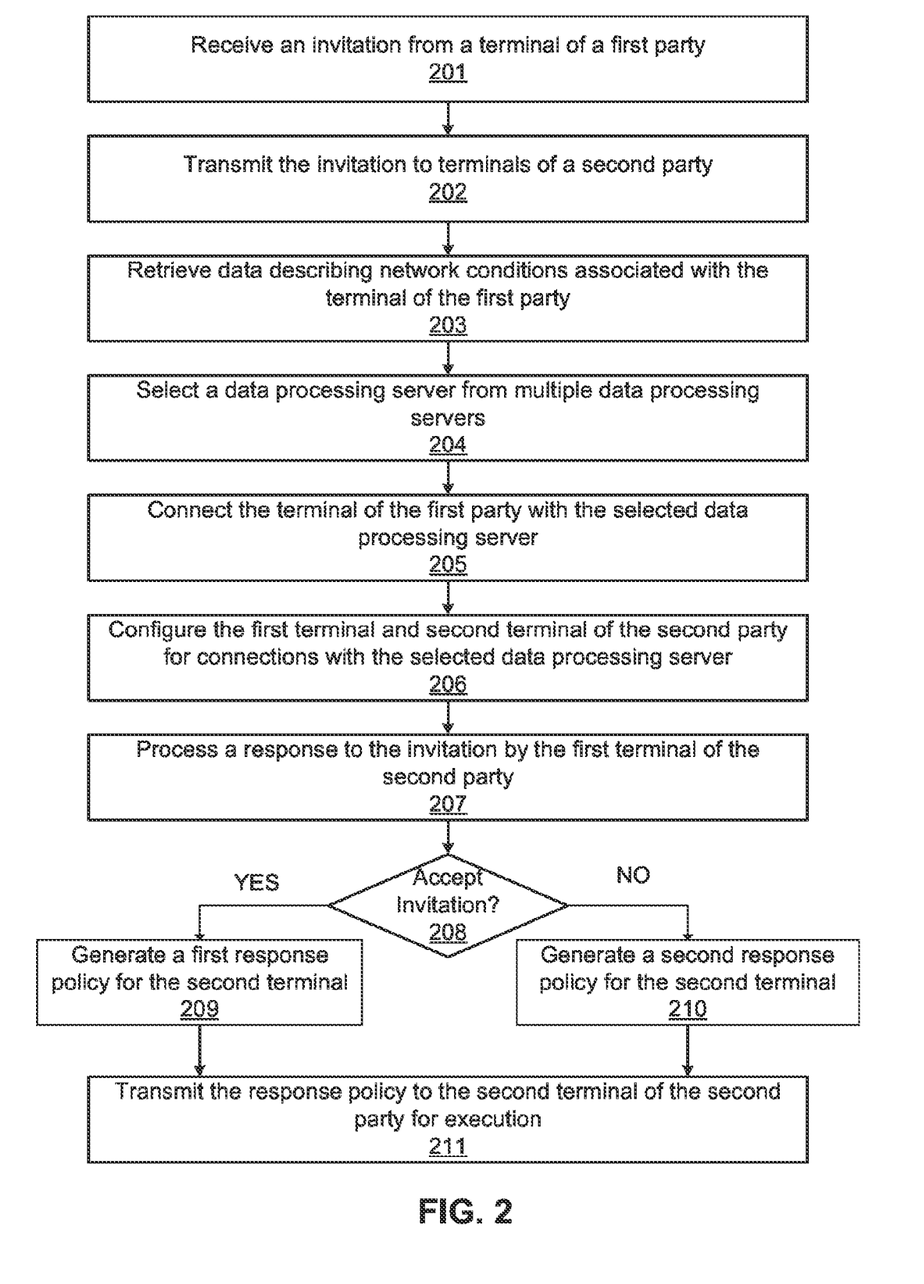
FIG. 2 is a flowchart illustrating a process for generating a response policy to an instant messaging invitation from a first user to communication terminals of a second user according to one embodiment.

FIG. 2 is a flowchart illustrating a process for generating a response policy to an instant messaging invitation from a first user to communication terminals of a seconder user according to one embodiment. Some embodiments may perform the steps in parallel, perform the steps in different orders, or perform different steps.

Initially, a communication server such as the communication server 44B illustrated in FIG. 6 receives 201 an IM invitation, e.g., a video instant messaging invitation, from a communication terminal of a first party to a second party's IM account. The communication server 44B transmits 202 the invitation to the terminals of the second party, where the terminals of the second party have logged into a same IM account of the second party. Assume the second party has two communication terminals for the simplicity of illustration. Each of the first party and the second party may have more than two communication terminals in other embodiments.

To support a large number of users/parties simultaneously using an IM platform supported by the communication server 44B, the communication server 44B retrieves 203 data describing network condition associated with the terminal of the first party from data collection storage. The network conditions may include network connection speed, data packet loss rate and other related information. The communication server 44B selects 204 a data processing server from multiple data processing servers. Examples of the data processing servers are the data transmitters 450a-450n illustrated in FIG. 6.

The communication server 44B connects 205 the terminal of the first party with the selected data processing server. The communication server 44B configures 206 the first terminal and the second terminal of the second party for connection with the selected data processing server. The configuration may include determining whether both the first terminal and the second terminal of the second party have logged into the same IM account of the second party that received the invitation. The communication server 44B processes 207 a response to the invitation by a terminal, e.g., the first terminal, of the second party.

The communication server 44B determines 208 the type of the response, acceptance or rejection. Responsive to the response being an acceptance, the communication server 44B generates 209 a first response policy for the second terminal. An example of the first response policy is "Your IM account has already been logged in by a PC, which has accepted the invitation. Start video chat" Responsive to the response being a rejection, the communication server 44B generates 209 a second response policy for the second terminal. An example of the first response policy is "Your IM account has already been logged in by a PC, which has rejected the invitation. The invitation on your display is to disappear." The communication server 44B transmits 211 the response policy to the second terminal of the second party for execution.

Compared with existing solutions, the enhanced IM processing system advantageously supports multiple communication terminals of a party to participate in IM communication while without losing precious computing resources, e.g., computing power wasted in fruitlessly trying to respond to an IM invitation. In addition to optimizing IM communication among multiple terminals of a single user, the enhanced IM processing system also advantageously supports simultaneous IM communications by a large number users and enhances user experience by balancing load among data transmitters that carry the IM communication.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, or any combinations thereof.

Any of the steps, operations, or processes described herein may be performed or implemented with one or more hardware software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method of processing invitations for instant messaging, the method comprising:

Monitoring, by a communication server, an invitation for instant messaging provided to an instant messaging account of a user through a network, the instant messaging account accessible by the user from a first communication terminal and from a second communication terminal, the invitation provided both to the first communication terminal and to the second communication terminal;

receiving, by the communication server, a response from the first communication terminal to the invitation through the network;

generating, by the communication server, a response policy for the second communication terminal based on the response from the first communication terminal; and providing, by the communication server, the response policy to the second communication terminal through the network, the response policy concerning the invitation previously provided to the second communication terminal.

2. The method of claim 1, wherein the response from the first communication terminal is either an acceptance of the invitation or a rejection of the invitation.

3. The method of claim 1, wherein one of the communication terminals is a personal computer and another of the communication terminals is a portable computing device.

4. The method of claim 1, wherein the response from the first communication terminal is an acceptance of the invitation and the generated response policy indicates that the invitation has been accepted.

5. The method of claim 1, wherein the response from the first communication terminal is a rejection of the invitation and the generated response policy indicates that the invitation has been rejected.

6. The method of claim 1, wherein the instant messaging is video instant messaging among two or more users, and communication between the users is captured and transmitted in a digital video format.

7. A non-transitory computer readable medium storing executable computer program instructions for processing instant messaging, the computer program instructions comprising instructions for:

monitoring an invitation of instant messaging sent to an instant messaging account of a user, the instant messaging account accessible by the user from a first communication terminal and from a second communication terminal, the invitation provided both to the first communication terminal and to the second communication terminal;

receiving a response from the first communication terminal to the invitation;

generating a response policy for the second communication terminal based on the response from the first communication terminal; and providing the response policy to the second communication terminal, the response policy concerning the invitation previously provided to the second communication terminal.

8. The computer-readable storage medium of claim 7, wherein the response to the invitation from the first communication terminal is either an acceptance of the invitation or a rejection of the invitation.

9. The computer-readable storage medium of claim 7, wherein the first communication terminal is a personal computer and the second communication terminal is a portable computing device.

10. The computer-readable storage medium of claim 7, wherein the response from the first communication terminal is an acceptance of the invitation and the generated response policy indicates that the invitation has been accepted.

11. The computer-readable storage medium of claim 7, wherein the response from the first communication terminal is a rejection of the invitation and the generated response policy indicates that the invitation has been rejected.

12. The computer-readable storage medium of claim 7, wherein the instant messaging is video instant messaging among two or more users, and the communication between the two users is captured and transmitted in a digital video format.

13. A computer-implemented method of processing instant messaging among a plurality of communication parties, the method comprising:

receiving, by a communication server, an invitation of instant messaging from a sending user through a network, the invitation sent to an instant messaging account of a receiving user, the instant messaging account accessible by the receiving user from a first communication terminal and from a second communication terminal, the invitation provided both to the first communication terminal and to the second communication terminal;

transmitting, by the communication server, the invitation to the instant messaging account of the receiving user through the network;

retrieving, by the communication server, data describing network conditions associated with a communication terminal sending the invitation through the network;

selecting, by the communication server, a data processing server from a plurality of data processing servers based on the retrieved data; and processing the invitation and response to the invitation by the selected data processing server, comprising:
responsive to the response to the invitation from the first communication terminal being an acceptance of the invitation, generating a first response policy for the second communication terminal, the first response policy indicating that the invitation has been accepted by the first terminal communication terminal; and
responsive to the response to the invitation from the first communication terminal being a rejection of the invitation, generating a second response policy for the second communication terminal, the second response policy indicating that the invitation has been rejected by the first terminal communication terminal.

14. The method of claim 13, wherein processing the invitation and response to the invitation comprises:
connecting the communication terminal of the sending user to the selected data processing server.

15. The method of claim 13, wherein processing the invitation and response to the invitation further comprises:
connecting the first communication terminal and the second communication terminal of the receiving user to the selected data processing server.

16. The method of claim 13, wherein processing the invitation and response to the invitation further comprises:
determining the type of the response to the invitation from the first communication terminal of the receiving user.

17. The method of claim 16, wherein the type of the response to the invitation from the first communication terminal is either the acceptance of the invitation or the rejection of the invitation.

18. The method of claim 13, wherein the instant messaging is video instant messaging among the sending user and the receiving user, and communication between the two parties is captured and transmitted in a digital video format.

19. The method of claim 13, wherein the first communication terminal is a personal computer and the second communication terminal is a portable computing device.

20. A non-transitory computer readable medium storing executable computer program instructions for processing instant messaging among a plurality of communication parties, the computer program instructions comprising instructions for:

receiving an invitation of instant messaging from a sending user, the invitation sent to an instant messaging account of a receiving user, the instant messaging account accessible by the receiving user from a first communication terminal and from a second communication terminal, the invitation provided both to the first communication terminal and to the second communication terminal;

transmitting the invitation to the instant messaging account of the receiving user;

retrieving data describing network conditions associated with a communication terminal sending the invitation;

selecting a data processing server from a plurality of data processing servers based on the retrieved data; and processing the invitation and response to the invitation by the selected data processing server, comprising:

responsive to the response to the invitation from the first communication terminal being an acceptance of the invitation, generating a first response policy for the second communication terminal, the first response policy indicating that the invitation has been accepted by the first terminal communication terminal; and responsive to the response to the invitation by the first communication terminal being a rejection of the invitation, generating a second response policy for the second communication terminal, the second response policy indicating that the invitation has been rejected by the first terminal communication terminal.

21. The computer readable medium of claim 20, wherein the computer program instructions for processing the invitation and response to the invitation comprise instructions for:

connecting the communication terminal of the sending user to the selected data processing server.

22. The computer readable medium of claim 20, wherein the computer program instructions for processing the invitation and response to the invitation comprise instructions for:

connecting the first communication terminal and the second communication terminal of the receiving user to the selected data processing server.

23. The computer readable medium of claim 20, wherein the computer program instructions for processing the invitation and response to the invitation comprise instructions for:

determining the type of the response to the invitation from the first communication terminal of the receiving user.

24. The computer readable medium of claim 23, wherein the type of the response to the invitation from the first communication terminal is the acceptance of the invitation or the rejection of the invitation.

25. The computer readable medium of claim 20, wherein the instant messaging is video instant messaging among the sending user and the receiving user, and communication between the two users is captured and transmitted in a digital video format.

26. The computer readable medium of claim 20, wherein the first communication terminal is a personal computer and the second communication terminal is a portable computing device.

* * * * *